US012718681B2

(12) United States Patent
Apczynski et al.

(10) Patent No.: US 12,718,681 B2
(45) Date of Patent: Aug. 25, 2026

(54) DETECTION OF A VEHICLE BY ONE OR MORE OTHER VEHICLES

(71) Applicant: FCA US LLC, Auburn Hills, MI (US)

(72) Inventors: Thomas E Apczynski, Livonia, MI (US); Alan R Cea, Austin, TX (US)

(73) Assignee: FCA US LLC, Auburn Hills, MI (US)

( * ) Notice: Subject to any disclaimer, the term of this patent is extended or adjusted under 35 U.S.C. 154(b) by 136 days.

(21) Appl. No.: 18/433,520

(22) Filed: Feb. 6, 2024

(65) Prior Publication Data

US 2025/0252841 A1 Aug. 7, 2025

(51) Int. Cl.
*G08B 25/00* (2006.01)
*G06V 20/58* (2022.01)
*G06V 20/62* (2022.01)

(52) U.S. Cl.
CPC ............ *G08B 25/00* (2013.01); *G06V 20/58* (2022.01); *G06V 20/625* (2022.01)

(58) Field of Classification Search
CPC ...... G08B 25/00; G06V 20/58; G06V 20/625; G06V 20/52; G06V 40/172; H04N 7/181
See application file for complete search history.

(56) References Cited

U.S. PATENT DOCUMENTS 9,767,675 B2 * 9/2017 Hutchings ........ G08G 1/096791
10,726,274 B1 * 7/2020 Hasegawa ............. H04N 7/181
2008/0231470 A1 * 9/2008 Ioli ........................ G06Q 10/00 340/932.2
2019/0147723 A1 * 5/2019 Sawada ............. G08B 21/0423 340/573.4
2020/0126407 A1 * 4/2020 Sakito .................... G06V 20/52
2020/0211216 A1 * 7/2020 Hagio ..................... G06T 7/248
2020/0272826 A1 * 8/2020 Hasegawa ............ G06V 40/172
2022/0100999 A1 * 3/2022 Hill ...................... G08G 1/0116
2023/0067617 A1 * 3/2023 Riley .................... H04W 4/029
2023/0342874 A1 * 10/2023 Lu .......................... G06Q 50/40
2023/0419540 A1 * 12/2023 Ganlath ................. G06V 10/25
2024/0185434 A1 * 6/2024 Wyffels .................. G06V 20/58
2024/0367580 A1 * 11/2024 Popiel .................... G06Q 30/06
2025/0111679 A1 * 4/2025 Zhong .................... G08G 1/005
2025/0175580 A1 * 5/2025 Loccisano ............ G06V 40/172
2025/0191385 A1 * 6/2025 Ko ......................... G06V 20/56
2025/0214504 A1 * 7/2025 Aoki ............... G08G 1/096741
2025/0232590 A1 * 7/2025 Sakai .................. H04N 23/661

* cited by examiner

*Primary Examiner* — Curtis J King
(74) *Attorney, Agent, or Firm* — Jeremy J. Klobucar

(57) ABSTRACT

A system for identifying a vehicle includes receiving in a network vehicle a search notification relating to a subject vehicle to be located including subject vehicle identification information. Thereafter, a camera in the network vehicle is activated to obtain an image that includes at least one vehicle that is not the network vehicle. Image vehicle identification information of the at least one vehicle in the image is reviewed and compared to the subject vehicle identification information to determine if the at least one vehicle in the image is a match for the subject vehicle, and then a match notification is sent to a third party when the match is determined.

20 Claims, 2 Drawing Sheets

DETECTION OF A VEHICLE BY ONE OR MORE OTHER VEHICLES

FIELD

The present disclosure relates to a system for detecting a vehicle using one or more other vehicles.

BACKGROUND

Emergency alerts are issued to enable the public to assist in locating a vehicle including a wanted or missing person. The alerts are provided by text message to mobile phones, emails, news agencies and the like. While helpful to have more people aware of the emergency information, among other issues, the alerts create a risk of driver's being distracted by searching, and people becoming unduly or undesirably involved in the search.

SUMMARY

In at least some implementations, a method for identifying a vehicle includes receiving in a network vehicle a search notification relating to a subject vehicle to be located including subject vehicle identification information. Thereafter, a camera in the network vehicle is activated to obtain an image that includes at least one vehicle that is not the network vehicle. Image vehicle identification information of the at least one vehicle in the image is reviewed and compared to the subject vehicle identification information to determine if the at least one vehicle in the image is a match for the subject vehicle, and then a match notification is sent to a third party when the match is determined.

In at least some implementations, the subject vehicle identification information includes a license plate code for a license plate of the subject vehicle, and the step of reviewing the image vehicle identification information includes determining that a vehicle license plate of the at least one vehicle is within the image and then determining the license plate code for the license plate of the at least one vehicle. In at least some implementations, the step of reviewing the image vehicle identification information is accomplished by a vehicle control system. In at least some implementations, the image is transmitted from the network vehicle to a remote server and the step of reviewing the image vehicle identification information is accomplished by a processor associated with the remote server.

In at least some implementations, the match notification includes a location of one or both of the network vehicle and the subject vehicle.

In at least some implementations, the match notification is sent to one or more other network vehicles within a threshold area determined as a function of a location of the network vehicle.

In at least some implementations, the match notification is sent to a law enforcement server for distribution to one or more law enforcement agencies.

In at least some implementations, the method is performed without notification to a driver of the network vehicle.

In at least some implementations, the match notification includes, for the subject vehicle, a vehicle speed and a direction of travel. In at least some implementations, the vehicle speed and the direction of travel for the subject vehicle are determined based on information from the network vehicle.

In at least some implementations, the camera is mounted on the network vehicle and has a field of view including at least part of an area outside of the network vehicle. In at least some implementations, the camera is one of a forward facing camera or rearward facing camera.

In at least some implementations, multiple images are obtained and the reviewing and comparing steps are run on the multiple images.

In at least some implementations, the subject vehicle identification information includes a color of the subject vehicle.

In at least some implementations, a system of a network vehicle for detecting a subject vehicle includes a communications unit having a receiver by which information is received at a network vehicle and a transmitter by which information is transmitted from the network vehicle, a camera having a field of view including at least part of a road on which the network vehicle is traveling, a position sensor arranged to provide information relating to the location of the network vehicle, a control system that includes a data storage unit and an electronic control unit, and a backend portion. The backend portion may be part of a cloud-based system, and the backend portion is configured to transmit a search notification including subject vehicle identification information to one or more network vehicles and to receive a match notification from the one or more network vehicles when a match is determined. The control system is configured to cause the camera to capture images upon receipt of a search notification by the communications unit, and the control system is configured to analyze image vehicle identification information contained in the images or to transmit the images to the backend portion or both.

In at least some implementations, the backend portion includes a processor with programming to recognize elements of codes on the license plates in the images.

In at least some implementations, the match is determined, the location of the network vehicle is obtained from the position sensor.

In at least some implementations, the backend portion is communicated with multiple network vehicles and receives and analyzes images from the multiple network vehicles. In at least some implementations, the multiple network vehicles are within a threshold area determined as a function of a determined area in which the subject vehicle could be located.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
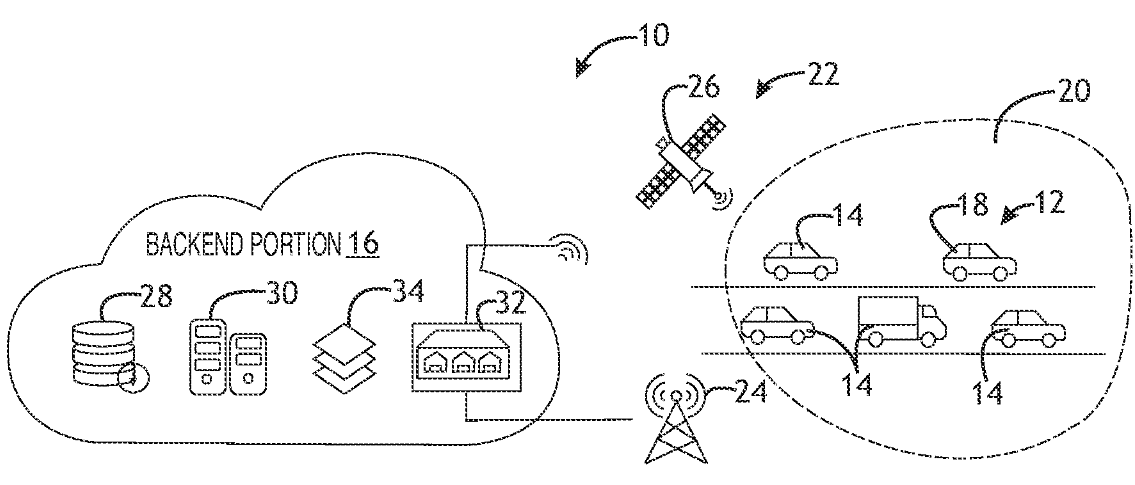
FIG. 1 is a diagrammatic view of a system for detecting a vehicle of interest.

Referring in more detail to the drawings, FIG. 1 illustrates a vehicle detection system 10 including a frontend portion 12 with one or more network vehicles 14 that are traveling along one or more roads and that are in communication with a backend portion 16. The network vehicles 14 are used to locate a subject vehicle 18 within an immediate area of one or more network vehicles 14, such as by use of information/images captured by the network vehicles 14. The images may be analyzed by image recognition tools to determine one or more identification features of imaged vehicles within an image, and to determine whether an identity of an imaged vehicle matches that of the subject vehicle 18. Numerous network vehicles 14 may be spread across a geographic search area 20 and enable determination of whether the subject vehicle 18 is within a search area 20 without direct operator involvement. That is, sensors/cameras and control systems of network vehicles 14 can be operated in the background, and the output thereof analyzed, without driver or passenger involvement, to avoid distractions and enable efficient searching for a subject vehicle 18. The system 10 may include a cloud-based component to provide a search notification to network vehicles 14 to comments a search method, and to gather and analyze real-time from a distributed grouping or fleet of network vehicles 14 each of which can provide information about one or more vehicles nearby, and collectively, many vehicles can be reviewed over a large geographic search area 20.

Figure 2:
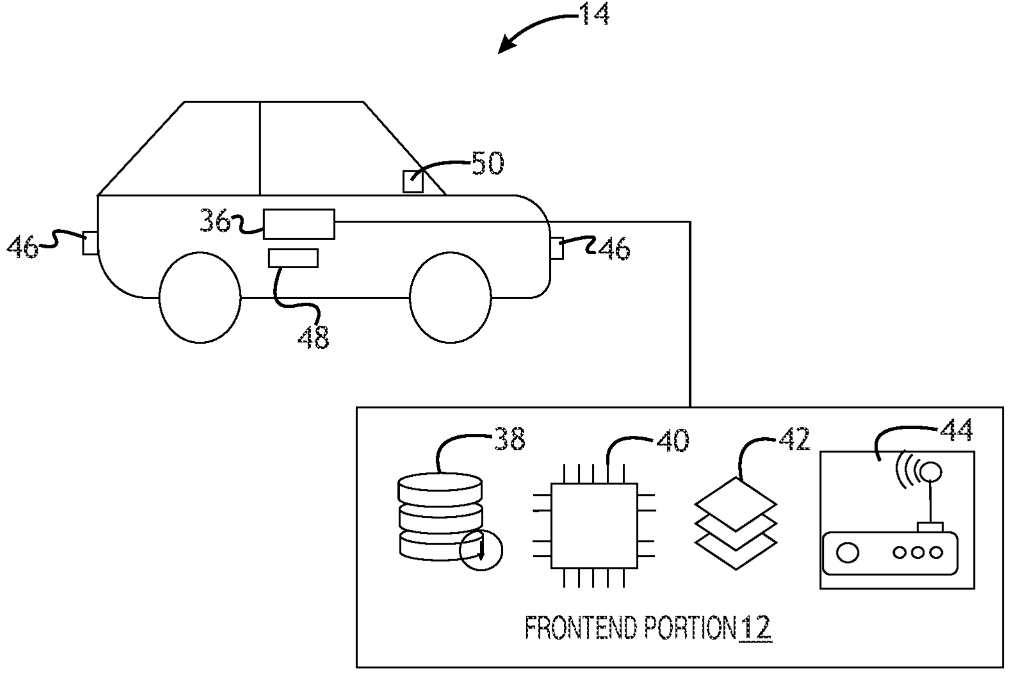
FIG. 2 is a diagrammatic view of a vehicle that defines part of the system.

With reference to the schematic block diagrams in FIGS. 1 and 2, the vehicle detection system 10 may be a cloud-based system that may send out a search notification to network vehicles 14. The notification may be sent out to all network vehicles 14 or only the network vehicles 14 within a predetermined search area 20. The system 10 may gather real-time vehicle identification information from network vehicles 14, and the system 10 may analyze the information to determine if the subject vehicle 18 is near a network vehicle 14. The term "real-time", as used herein, does not strictly require that such information and notifications be generated, sent, received and/or otherwise processed at the exact moment when their underlying events or conditions occur in order to be "real-time". Rather, these terms broadly include any such information and notifications that are generally contemporaneous with their underlying events or conditions so that the vehicle identification information and notifications are still relevant or accurate in the context of the present system and method (e.g., within seconds, minutes or even hours of their underlying events or conditions). System 10 may deliver hosted services via the internet and/or other communication networks and may be structured as a public, private or hybrid cloud.

According to one non-limiting example, vehicle identification system 10 is structured as a private cloud and generally includes the backend portion 16 and the frontend portion 12 that is distributed across a fleet of network vehicles 14, where each network vehicle 14 is capable of obtaining and providing vehicle identification information, such as by capturing images in its immediately surrounding area, as well as communicating with the backend system 20 over a secure communications network 22 (e.g., secure vehicle-to-cloud (V2C) network). The secure communications network 22 may include a cellular-based network 24, a satellite-based network 26, a city-wide WiFi-based network, some other type of communications network and/or a combination thereof. Although only a few network vehicles 14 are shown in the drawings, it should be appreciated that system 10 may interact with a large fleet of vehicles that can include dozens, hundreds, thousands or even more vehicles. System 10 may be used with any vehicles, including (but not limited to) passenger, commercial and/or public transportation vehicles sold in any geographic area.

Backend portion 16 may include any suitable combination of software and/or hardware resources typically found in a backend of a cloud-based system, as best illustrated in FIG. 1. The backend portion 16 may be responsible for managing some of the programs and algorithms that run applications on the frontend portion 12, such as those that request, obtain and optionally analyze images or other vehicle identification information. It is noted that the vehicle identification information may be analyzed by control systems 36 and processors thereof on-board a network vehicle 14 or by the backend portion 16 or both, as desired. The backend portion 16 may be managed or controlled by the vehicle manufacturer and can be part of a larger cloud-based system that the vehicle manufacturer uses to communicate and interact with a large fleet of vehicles for a multitude of purposes, not just vehicle detection and alerts. The backend portion 16 may include or communicate with emergency alert systems, such as those that provide Amber alerts or other missing persons alerts, or law enforcement systems that may provide and receive information regarding vehicles of interest to them.

The backend portion 16 may include any suitable combination of software and/or hardware resources including, but not limited to, components, devices, computers, modules and/or systems such as those directed to applications, service, storage, management and/or security (each of these resources is referred to herein as a "backend resource," which broadly includes any such resource located at the backend portion 16). In one example, the backend portion 16 has a number of backend resources including data storage systems 28, servers 30, communication systems 32, programs and algorithms 34, as well as other suitable backend resources. It should be appreciated that backend portion 16 is not limited to any particular architecture, infrastructure or combination of elements, and that any suitable backend arrangement may be employed.

Frontend portion 12 may include any suitable combination of software and/or hardware resources typically found in a frontend of a cloud-based system, as shown in FIG. 2, and is generally responsible for receiving real-time search notifications from the backend portion 16. Depending on the particular arrangement, the frontend portion 12 may also be responsible for gathering camera, sensor, location and/or other data from devices on the vehicle and sending such information to the backend portion 16. The frontend portion 12 is typically responsible for running the applications that interface with the users in the different vehicles 14, and for interfacing with the programs and algorithms 34 of the backend portion 16. The frontend portion 12 may also be managed or controlled by the vehicle manufacturer and can be part of a larger cloud-based system that the vehicle manufacturer uses to communicate and interact with a large fleet of vehicles for various purposes, as mentioned above. The frontend portion 12 may be distributed across one or more vehicles 14 and may include any suitable combination of software and/or hardware resources including, but not limited to, components, devices, computers, modules and/or systems (each of these resources is referred to herein as a "frontend resource," which broadly includes any such resource located at the frontend portion 12).

In one example, the frontend portion 12 has a number of frontend resources including a control system 36 having one or more vehicle electronic module(s) installed in vehicles 14, which may include some combination of a data storage unit 38, an electronic control unit 40, applications 42, a communications unit 44 (e.g., one that includes a telematics unit and/or other communication devices), as well as other suitable frontend resources. The control system 36/vehicle electronic module(s) may be or include a telematics control module (TCM), a body control module (BCM), an infotainment control module, or any other suitable module known in the art. It is not necessary for the preceding units to be packaged in a single vehicle electronic module, as illustrated in FIG. 2; rather, they could be distributed among multiple vehicle electronic modules, they could be stand-alone units, they could be combined or integrated with other units or devices, or they could be provided according to some other configuration. It should be appreciated that frontend portion 12 is not limited to any particular architecture, infrastructure or combination of elements, and that any suitable frontend arrangement may be employed.

In addition to the frontend portion 12, each vehicle 14 may further include one or more identification information sensors or devices, such as one or more camera(s) 46, and one or more vehicle position sensor(s) 48, as well as other suitable devices. The camera(s) 46 and position sensor(s) 48 are illustrated as being stand-alone items, however, these devices could be combined or integrated with vehicle electronic module(s) or any other unit, device, computer, module and/or system within the vehicle (each of these resources is referred to herein as a "vehicle resource," which broadly includes any such resource located at the vehicle). It is worth noting that a vehicle resource may also be a frontend resource and vice-versa. Each vehicle device 46, 48 may be connected to the frontend portion 12, the vehicle electronic module 36, the individual units 38-44 of the vehicle electronic module 36 and/or to each other via a vehicle communications network or bus, such as a controller area network (CAN) or a local interconnect network (LIN). The same applies to the different units 38-*s* of the vehicle electronic module 36.

Camera(s) 46 are mounted on network vehicle 14 and may capture images from a wide or expansive field-of-view around the vehicle. According to one non-limiting example, camera 46 is a 360° camera that is mounted at an elevated exterior or interior position on the network vehicle 14 (e.g., on the roof, in or near a rearview mirror, on the dashboard, in a front windshield, in a rear window, etc.) such that it can obtain images from multiple sides of the vehicle. One or more cameras 46 could be located at the exterior of the vehicle, such as in a front bumper or fascia (a forward facing camera), a rear bumper or fascia (a rearward facing camera), or at a side of the vehicle (e.g. in or on a side view mirror). Camera 46 is preferably connected to the frontend portion 12 and/or other vehicle devices, such as module 36 and/or units 38-44, so that it can provide those devices with image-based information. In some embodiments, a single camera 46 may be sufficient for surveying the surrounding area and providing information used to determine if a subject vehicle 18 is near the network vehicle 14 including the single camera 46, and in other embodiments, multiple cameras 46 may be used.

The vehicle includes one or more vehicle position sensor(s) 48 configured to obtain a current position or location of the vehicle. According to a preferred example, the vehicle position sensors 48 include a global positioning system (GPS) unit, such as is used in navigation systems and programs. It is also possible, however, to use inertial navigation system sensors and/or other types of position sensors. In some embodiments, the vehicle position sensor(s) 48 may be part of a telematics system or unit and/or other device that is provided within the communications unit 44. The telematics system may use one or more communication protocols and have a receiver by which information is received at the network vehicle 14 and a transmitter by which information is transmitted from the network vehicle 14 (and these things can be integrated as in a transceiver or separate devices, as desired). Regardless of the particular type of sensor used, the vehicle position sensor(s) 48 may be connected to the frontend portion 12 and/or other vehicle devices, such as module 36 and/or units 38-44, so that it can provide those devices with vehicle-based and/or area-based location data, as will be explained.

User interface(s) 50 are mounted on remote vehicle 14 and, as their name suggests, are designed to interface or interact with users within the vehicle. User interface(s) 50 may include visual interfaces, such as interactive touch screens, infotainment screens, instrument displays, heads-up displays, etc.; they may include audio interfaces like radios, speakers, infotainment systems, audible chimes, etc.; they may include wireless interfaces such as those that connect with a mobile phone or other mobile device; or they may include other types of interfaces. In one non-limiting example, the user interface(s) 50 include both a visual interface in the form of an interactive touch screen, as well as a wireless interface that sends a message to an already paired smart phone or other personal electronic device in the vehicle.

The system 10 may be used to implement a search strategy for a subject vehicle 18. A subject vehicle 18 may be related to a missing or endangered person, such as, but not limited to, an Amber alert (typically relating to child abduction), Blue alert (relating to violent offenders), Silver alert (relating to missing senior citizens), Camo alert (missing former military personnel), Feather alert (relating to a missing indigenous person), Yellow alert (relating to a hit and run accident resulting in death), Clear alert (missing adults, not senior citizens), Endangered Missing Advisory (relating to missing person with cognitive impairment), and others. Such alerts often identify a vehicle of interest, or subject vehicle 18, associated with the person(s) to be located, with the intention of allowing the public to help identify and locate the subject vehicle 18 in a wider geographic area.

While these alerts can be effective, there are limitations and problems with the alert system. For example, the alerts may be ignored by many people, and the specific vehicle identification information might not be remembered or may be misremembered. Further, drivers of vehicles should be focused on the road and their safe travel, and trying to read license plates and "be on the lookout for" and find a subject vehicle 18 can be distracting to drivers of vehicles on the road. Additionally, some people may feel a duty or need to follow a subject vehicle 18 if located and this can lead to dangerous conditions.

In view of these and other things, the systems and methods described herein may enable vehicle identification without driver intervention. When an alert to locate a subject vehicle 18 is issued and received by network vehicles 14, the control system 36/frontend portion 12 of each network vehicle 14 that receives the alert can implement a method 52 to determine if the subject vehicle 18 is near a network vehicle 14.

Figure 3:
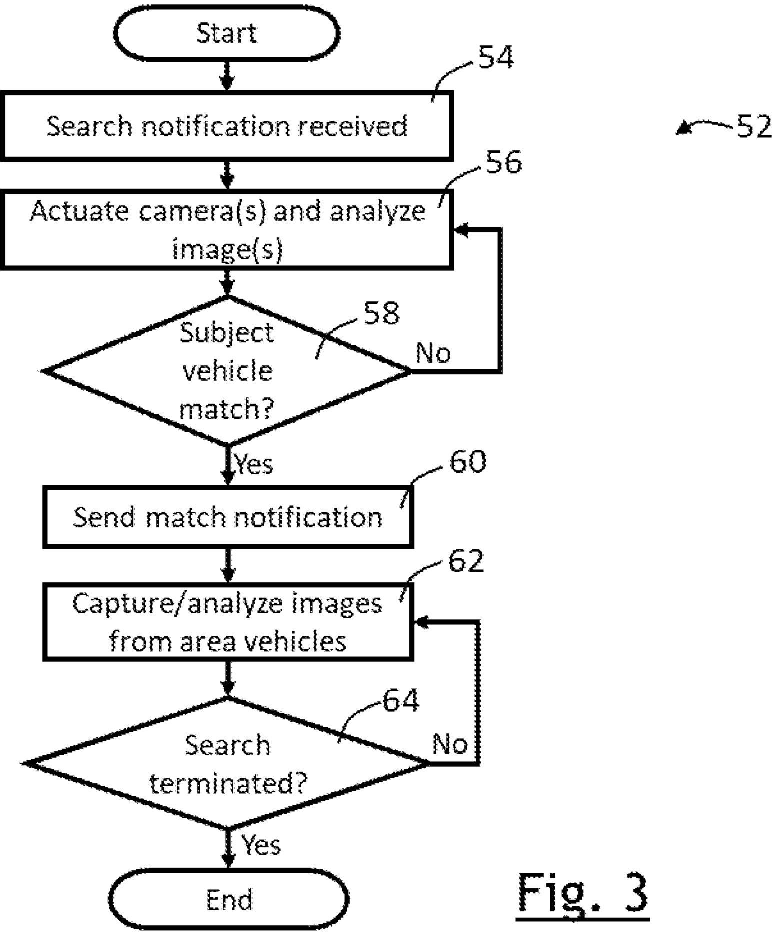
FIG. 3 is a flowchart of a method for identifying a subject vehicle via one or more network vehicles.

FIG. 3 is a flowchart of a representative method 52. In this method 52, a search notification is issued and received at a network vehicle 14 in step 54. The network vehicle 14 then, in step 56, captures one or more images from one or more vehicle cameras 46, and then the images can be analyzed to determine if a subject vehicle 18 is within an image. The analysis can be done by/within the frontend portion 12, such as by a vehicle control system 36 or module, or at the backend portion 16, or both.

The analysis may include image recognition algorithms such as those which enable automated/computer system determination of alphanumeric or other elements of a vehicle license plate. In this way, license plates that appear within an image are vehicle identification information and can be read and analyzed to determine if there is a match with the subject vehicle 18 of the issued alert. Additional vehicle identification information can be determined by the systems and methods, and dependent on the quality of images captured with respect to the vehicle in question, and the image recognition programs or techniques utilized. Non-limiting examples of additional vehicle identification information include, vehicle make, model, color, number of people within the vehicle, a location of the vehicle determined to be the subject vehicle 18 at the time of the image capture, direction/heading and/or speed of the vehicle and the like.

Next, in step 58, when a vehicle match to the subject vehicle 18 is determined to exist, a match notification may be sent in step 60, for example, to the backend portion 16 and/or to network vehicles 14 and/or to law enforcement via a law enforcement server (which may be any server accessible by or used by law enforcement). The match notification may, if desired, be focused on or limited to network vehicles 14 within a given area of the vehicle from which the match was determined to limit the resources used and information generated to a specific area of interest, if desired. Such network vehicles 14 may then, in step 62, be used to provide additional images of the subject vehicle 18 over time, which may assist in tracking and maintaining a match determination of the subject vehicle 18 to facilitate law enforcement in locating the subject vehicle 18. The area in which a match notification is issued may be dependent upon, for example, density of traffic (e.g. number of network vehicles 14 in a given area), the speed of travel, the number of roads or travel path options that may be chosen by the subject vehicle 18, and other factors, if desired. The match notification could also or instead include a predetermined geographic area (e.g. one square mile or otherwise, as desired). When a search has ended or is terminated, noted in step 64, a suitable notice may be sent to network vehicles 14 to cancel the method and so that additional images that are not needed for a search are not taken/analyzed for that purpose.

Further, the method 52 and system 10 may be adjustable and flexible, and may function differently on different network vehicles 14, for example, as a function of the location of a network vehicle 14. Vehicles within a first threshold area of the search area, that may be deemed more likely to include the subject vehicle 18, may be managed to provide images at a greater rate (time interval between images) than vehicles outside the first threshold area and within a second threshold area. By way of another example, image frequency may be changed when a subject vehicle match has been determined, especially in the area where the match notification originated. In general, the rate or frequency of images and the time duration in which images are captured by one or any number of network vehicles 14 can be adjusted as desired.

Notably, the above steps may be automated and may occur without intervention by or requiring interaction with the drivers of the network vehicles 14. In this way, many network vehicles 14 can efficiently search for a subject vehicle 18 in the background while being operated by drivers who are not distracted by the search. Of course, the standard alerts may still reach the driver/passengers of network vehicles 14 in other way, such as by cell phone alert, news agencies and the like, and the system 10 may provide notice(s) to the driver, such as via the user interface 50, if desired. So drivers may be otherwise looking for a subject vehicle 18 and the systems and methods herein may be supplemental and improve the search process and results.

To enable flexibility and scalability, the backend portion 16 may include or provide a server-less cloud infrastructure that can automatically scale up when an alert is received and a search notification issued. This can allow for real-time updates on the assumed location of the subject vehicle without requiring additional hardware or software installations. Using a dynamic and flexible backend/remote vehicle management system, vehicles can be reconfigured to work in a cooperative and coordinated fashion utilizing the backend portion/cloud to coordinate a network vehicle search fleet. The system and method may include a virtual follow-the-leader flocking and clustering algorithm when a subject vehicle is located that will facilitate maintaining and updating information about the location of the subject vehicle without any individual network vehicle having to adjust their intended travel path.

The system can calculate information such as the location, speed, and direction of the subject vehicle and can update other vehicles in the area to keep track of the subject vehicle. The algorithms can autonomously update the search fleet of network vehicles within range of the target and adjust the virtual cluster or area of interest to maintain tracking of the subject vehicle. These things can be accomplished while also reporting information back to law enforcement or other third party(ies).

The systems and methods can utilize on-board vehicle systems and cloud connectivity solutions to automatically locate a subject vehicle in real-time. This can dynamically configure network vehicles to begin looking for and tracking the suspect vehicle without the vehicle drivers knowing. Additionally, the system can take advantage of advanced sensing and connectivity technologies to enable network vehicles to work together in a swarm configuration, allowing multiple vehicles to track and send information about the location of the subject vehicle.

What is claimed is:

1. A method for identifying a vehicle, comprising:

sending to multiple network vehicles a search notification relating to a subject vehicle to be located including subject vehicle identification information;

obtaining an image from a camera in each of the multiple network vehicles, where at least some of the images include at least one vehicle that is not the network vehicle;

reviewing image vehicle identification information of the at least one vehicle in the images;

comparing the image vehicle identification information to the subject vehicle identification information to determine if the at least one vehicle in at least one of the images is a match for the subject vehicle; and sending a match notification to a third party when the match is determined, wherein the method is performed without intervention or response by drivers of the network vehicles.

2. The method of claim 1 wherein the subject vehicle identification information includes a license plate code for a license plate of the subject vehicle, and the step of reviewing the image vehicle identification information includes determining that a vehicle license plate of the at least one vehicle is within at least one of the images and then determining the license plate code for the license plate of the at least one vehicle.

3. The method of claim 2 wherein the step of reviewing the image vehicle identification information is accomplished by a vehicle control system.

4. The method of claim 2 wherein the images are transmitted from the network vehicle to a remote server and the step of reviewing the image vehicle identification information is accomplished by a processor associated with the remote server.

5. The method of claim 1 wherein the match notification includes a location of one or both of the network vehicle and the subject vehicle.

6. The method of claim 1 wherein the match notification is sent to one or more other network vehicles within a threshold area determined as a function of a location of the network vehicle from which the image was provided that resulted in the match notification.

7. The method of claim 1 wherein the match notification is sent to a law enforcement server for distribution to one or more law enforcement agencies.

8. The method of claim 1 wherein the method is performed without notification to a driver of the network vehicle.

9. The method of claim 5 wherein the match notification includes, for the subject vehicle, a vehicle speed and a direction of travel.

10. The method of claim 9 wherein the vehicle speed and the direction of travel are determined based on information from the network vehicle.

11. The method of claim 1 wherein the camera in each of the multiple network vehicles is mounted on the network vehicle and has a field of view including at least part of an area outside of the network vehicle on which the camera is mounted.

12. The method of claim 11 wherein the camera in each of the multiple network vehicles is one of a forward facing camera or rearward facing camera.

13. The method of claim 1 wherein multiple images are obtained from each of the multiple network vehicles and the reviewing and comparing steps are run on the multiple images.

14. The method of claim 1 wherein the subject vehicle identification information includes a color of the subject vehicle.

15. A system of a network vehicle for detecting a subject vehicle, comprising:

a communications unit having a receiver by which information is received at a network vehicle and a transmitter by which information is transmitted from the network vehicle;

a camera in the network vehicle having a field of view including at least part of a road on which the network vehicle is traveling;

a position sensor arranged to provide information relating to the location of the network vehicle;

a control system that includes a data storage unit and an electronic control unit; and a backend portion of a cloud-based system, wherein the backend portion is configured to transmit a search notification including subject vehicle identification information to one or more network vehicles and to receive a match notification from the one or more network vehicles when a match is determined, and wherein the control system is configured to cause the camera to capture images upon receipt of a search notification by the communications unit, and the control system is configured to analyze image vehicle identification information contained in the images and to transmit the images to the backend portion.

16. The system of claim 15 wherein the backend portion includes a processor with programming to recognize elements of codes on the license plates in the images.

17. The system of claim 15 wherein, when the match is determined, the location of the network vehicle is obtained from the position sensor.

18. The system of claim 15 wherein the backend portion is communicated with multiple network vehicles and receives and analyzes images from the multiple network vehicles.

19. The system of claim 18 wherein the multiple network vehicles are within a threshold area determined as a function of a determined area in which the subject vehicle could be located.

20. The system of claim 15 wherein the control system is configured to receive the search notification, to cause the camera to capture images, and to analyze image vehicle identification information contained in the images without intervention or response by drivers of the one or more network vehicles.

* * * * *